United States Patent

Imahori et al.

[11] 4,268,671
[45] May 19, 1981

[54] FLUORESCENT DYES

[75] Inventors: Seiichi Imahori, Kawasaki; Yukichi Murata, Yokohama; Syuichi Maeda, Tokyo; Sumio Suzuki, Yokohama, all of Japan

[73] Assignee: Mitsubishi Chemical Industries Ltd., Tokyo, Japan

[21] Appl. No.: 895,948

[22] Filed: Apr. 13, 1978

[30] Foreign Application Priority Data

Apr. 20, 1977 [JP] Japan .................. 52-45426

[51] Int. Cl.³ .............................. C09B 57/00
[52] U.S. Cl. ..................... 544/245; 544/115; 546/66
[58] Field of Search ................. 544/245, 115

[56] References Cited

U.S. PATENT DOCUMENTS 2,770,625 11/1956 Baumann .............. 260/261
3,103,403 9/1963 Eaton ....................... 8/55

*Primary Examiner*—Paul M. Coughlan, Jr.
*Attorney, Agent, or Firm*—Oblon, Fisher, Spivak, McClelland & Maier

[57] ABSTRACT

Fluorescent dyes having the formula

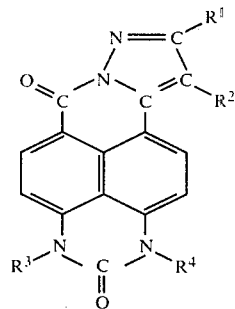

wherein $R^1$ represents hydrogen, $(C_1-C_8)$ alkyl, trifluoromethyl, $(C_1-C_4)$ alkoxycarbonyl, $(C_1-C_4)$ alkoxycarbonyl $(C_1-C_4)$ alkyl, phenyl, or aralkyl group; $R^2$ represents hydrogen, cyano, acyl, $(C_1-C_8)$ alkoxycarbonyl, $(C_1-C_4)$ alkoxy $(C_1-C_4)$ alkoxycarbonyl, $(C_1-C_4)$ alkoxy $(C_1-C_4)$ alkoxy $(C_1-C_4)$ alkoxycarbonyl, di$(C_1-C_4)$ alkylamino $(C_1-C_4)$ alkoxycarbonyl, cyclohexyloxycarbonyl, aryloxycarbonyl, benzyloxycarbonyl, tetrahydrofurfuryloxycarbonyl, carbamoyl, N-$(C_1-C_4)$ alkylcarbamoyl, N,N-di$(C_1-C_4)$alkylcarbamoyl, N-phenylcarbamoyl, or morpholinocarbonyl group; and $R^3$ and $R^4$ can be the same or different and each represents hydrogen, $(C_1-C_8)$ alkyl, $(C_1-C_4)$ alkoxy$(C_1-C_4)$ alkyl, aralkyl or phenyl group which can be substituted by halogen atoms, $(C_1-C_4)$ alkyl groups, or $(C_1-C_4)$ alkoxy groups.

6 Claims, No Drawings

FLUORESCENT DYES

BACKGROUND OF THE INVENTION

The present invention relates to heterocyclic compounds which are fluorescent dyes. More particularly, it relates to fluorescent dyes which are used for coloring organic high polymers such as synthetic fibers e.g. polyester fiber in fluorescent brilliant yellow having high fastnesses.

SUMMARY OF THE INVENTION

It is an object of the present invention to provide novel heterocyclic compounds which are fluorescent dyes having high light-fastness and sublimation fastness.

The heterocyclic compounds as the fluorescent dyes are novel compounds having the formula

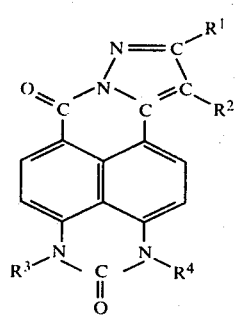

[I]

wherein $R^1$ represents hydrogen, $(C_1-C_8)$alkyl, trifluoromethyl, $(C_1-C_4)$alkoxycarbonyl, $(C_1-C_4)$alkoxycarbonyl$(C_1-C_4)$alkyl, phenyl, or aralkyl group; $R^2$ represents hydrogen, cyano, acyl, $(C_1-C_8)$alkoxycarbonyl, $(C_1-C_4)$alkoxy$(C_1-C_4)$alkoxycarbonyl, $(C_1-C_4)$alkoxy$(C_1-C_4)$alkoxy$(C_1-C_4)$alkoxycarbonyl, di$(C_1-C_4)$alkylamino$(C_1-C_4)$alkoxycarbonyl, cyclohexyloxycarbonyl, aryloxycarbonyl, benzyloxycarbonyl, tetrahydrofurfuryloxycarbonyl, carbamoyl, N-$(C_1-C_4)$alkylcarbamoyl, N,N-di$(C_1-C_4)$alkylcarbamoyl, N-phenylcarbamoyl, or morpholinocarbonyl group; and $R^3$ and $R^4$ can be the same or different and each represents hydrogen, $(C_1-C_8)$alkyl, $(C_1-C_4)$alkoxy$(C_1-C_4)$alkyl, aralkyl or phenyl group which can be substituted by halogen atoms, $(C_1-C_4)$alkyl groups, or $(C_1-C_4)$ alkoxy groups.

DETAILED DESCRIPTION OF THE PREFERRED EMBODIMENTS:

Suitable heterocyclic compounds include the compounds having the formula [I] wherein $R^1$ is hydrogen atom; $(C_1-C_8)$alkyl group such as methyl and ethyl groups; $(C_1-C_4)$alkoxycarbonyl group such as methoxycarbonyl, ethoxycarbonyl, propoxycarbonyl and butoxycarbonyl groups; $(C_1-C_4)$alkoxycarbonyl$(C_1-C_4)$alkyl group such as methoxycarbonylmethyl, ethoxycarbonylmethyl, propoxycarbonylmethyl and butoxycarbonylmethyl groups; and aralkyl group such as benzyl and phenethyl groups; phenyl group and trifluoromethyl group; $R^2$ is hydrogen atom; cyano group; acyl group such as acetyl and benzoyl groups; $(C_1-C_8)$alkoxycarbonyl group such as methoxycarbonyl, ethoxycarbonyl, propoxycarbonyl and butoxycarbonyl groups; $(C_1-C_4)$alkoxy$(C_1-C_4)$alkoxycarbonyl group such as methoxyethoxycarbonyl and ethoxyethoxycarbonyl groups; $(C_1-C_4)$alkoxy$(C_1-C_4)$alkoxy$(C_1-C_4)$alkoxycarbonyl group such as methoxyethoxyethoxycarbonyl, ethoxyethoxyethoxycarbonyl and propoxyethoxyethoxycarbonyl groups; di$(C_1-C_4)$alkylamino$(C_1-C_4)$alkoxycarbonyl group such as dimethylaminoethoxycarbonyl and diethylaminoethoxycarbonyl groups; cyclohexyloxycarbonyl group; aryloxycarbonyl group such as tolyloxycarbonyl and phenoxycarbonyl groups; benzyloxycarbonyl group; tetrahydrofurfuryloxycarbonyl group; carbamoyl group; N-$(C_1-C_4)$alkylcarbamoyl such as methylcarbamoyl, ethylcarbamoyl, propylcarbamoyl and butylcarbamoyl groups; N,N-di$(C_1-C_4)$alkylcarbamoyl group such as dimethylcarbamoyl and diethylcarbamoyl groups; N-phenylcarbamoyl group; and morpholinocarbonyl group; and $R^3$ and $R^4$ are respectively hydrogen atom; $(C_1-C_8)$alkyl group such as methyl, ethyl, propyl and butyl groups; $(C_1-C_4)$alkoxy$(C_1-C_4)$alkyl group such as methoxyethyl, ethoxyethyl, methoxypropyl and ethoxypropyl groups; aralkyl group such as benzyl and phenethyl groups; and phenyl group which can be substituted by halogen atoms, $(C_1-C_4)$alkyl groups or $(C_1-C_4)$alkoxy groups such as phenyl, p-methoxyphenyl, p-tolyl and p-chlorophenyl groups.

The heterocyclic compounds having the formula [I] can be produced by condensing a compound having the formula

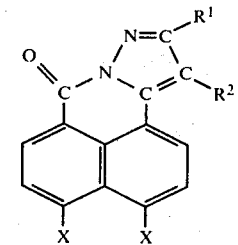

[II]

wherein $R^1$ and $R^2$ are defined above, and X represents a halogen atom, with a compound having the formula

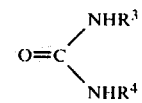

[III]

wherein $R^3$ and $R^4$ are defined above, to form a perimidone ring.

The heterocyclic compounds having the formula [I] can be also produced by reacting a compound having the formula

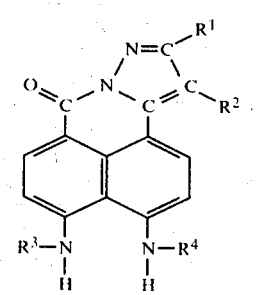

[IV]

wherein $R^1$, $R^2$, $R^3$ and $R^4$ are defined above, with a carbonylating agent such as phosgene and methyl chloroformate to form a perimidone ring.

The former process is preferable.

The heterocyclic compounds having the formula [I] wherein $R^2$ is hydrogen atom, can be produced by hydrolyzing the ester part of the compound having the formula

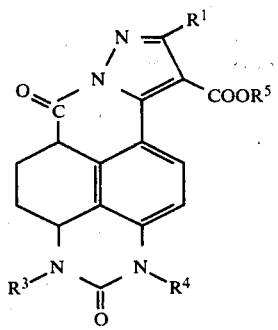
[V]

wherein $R^1$, $R^3$ and $R^4$ are defined above and $R^5$ represents an alkyl group, to perform a decarboxylation.

The heterocyclic compounds having the formula [I] wherein $R^2$ is hydrogen atom, can be also produced by reacting a compound having the formula

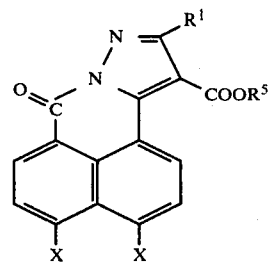
[VI]

wherein $R^1$, $R^5$ and X are defined above, with an urea compound having the formula

$R^3$—NH—CONHR$^4$ [VII]

wherein $R^3$ and $R^4$ are defined above to perform a hydrolysis and a decarbonylation in one step, to form a perimidone ring.

In order to effectively perform the hydrolysis and the decarbonylation, it is preferable to use the compounds having the formula [V] and [VI] wherein $R^5$ is a lower alkyl group such as methyl and ethyl groups.

The process for producing the heterocyclic compounds having the formula [I] will be further illustrated.

The reaction of the compound having the formula [II] with more than equimole of the urea compound having the formula [III] is carried out in an inert organic solvent such as chlorobenzene, O-dichlorobenzene, trichlorobenzene, nitrobenzene, O-nitrotoluene, diphenyl, diphenyl ether, N,N-dimethyl formamide, N-methylpyrrolidone, dimethyl sulfoxide, diphenyl ethane, quinoline, and alkylnaphthalene, at 100° to 250° C. preferably 150° to 230° C. The heterocyclic compound having the formula [I] can be isolated from the reaction mixture and purified it by the conventional manner.

The compound having the formula [II] can be produced as follows.

4,5-Dihalogenonaphthalic acid-N-aminoimide having the formula

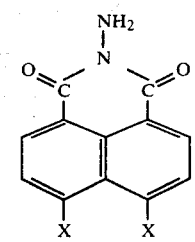
[VIII]

wherein X represents a halogen atom is reacted with a carbonyl compound having the formula

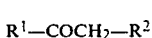

$R^1$—COCH$_2$—R$^2$ [IX]

wherein $R^1$ and $R^2$ are defined above, and the resulting hydrazone compound having the formula

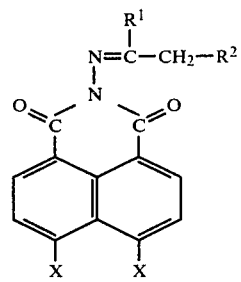
[X]

wherein $R^1$ and $R^2$ are defined above, is reacted with an alkaline condensing agent to form a cyclization.

The carbonyl compounds having the formula [IX] can be acetoacetic esters; phenyl acetoacetic esters; benzoyl acetoacetic esters; oxalacetic esters; 1,3-dicarbonyl compounds e.g. benzoyl acetone, acetyl acetone, dibenzoyl methane, formyl acetophenone and 2-thenoyltrifluoroacetone; acetone dicarboxylic acid diesters; acetoacetic acid amides and benzoyl acetonitrile.

In the reaction, 4,5-halogenonaphthalic-N-aminoimide having the formula [VIII] and at least equivalent of the carbonyl compound having the formula [IX] are heated in an inert organic solvent such as ethanol, isobutanol, monomethylglycol, acetic acid, chlorobenzene, dichlorobenzene, trichlorobenzene, nitrobenzene, O-nitrotoluene, N,N-dimethylformamide, or N-methylpyrrolidone, or in excess of the carbonyl compound having the formula [IX] in the presence of an acidic compound such as benzenesulfonic acid, toluenesulfonic acid, ethanesulfonic acid, aminosulfonic acid, sulfuric acid, phosphoric acid and hydrochloric acid at 80° to 200° C., and the reaction mixture is cooled to room temperature and is diluted with methanol, acetic acid or water, whereby the hydrazone compound having the formula [X] is isolated as crystals.

The resulting hydrazone compound is heated in an inert organic solvent such as butanol, isobutanol, pyridine, dimethyl sulfoxide, N,N-dimethyl formamide, dimethyl acetamide, hexamethyl phosphoric triamide and N-methylpyrrolidone in the presence of an alkaline compound such as sodium acetate, potassium acetate, sodium carbonate, potassium carbonate, sodium hydroxide, potassium hydroxide, piperidine, morpholine and triethylamine at 80° to 200° C. and the reaction mixture is cooled to room temperature and diluted with methanol, acetic acid or water to isolate 3,4-dihalogeno- 7H-benzo[de]pyrazolone[5,1-a]isoquinoline-7-on derivative having the formula [II] as crystals.

The organic high polymers which are dyed with the heterocyclic dyes of the present invention can be fibers, films, sheets and other shaped articles made of a synthetic polymer or an artifical polymer such as polyesters, polyesterethers, polyamides, polyurethanes, polyacrylonitriles, polyolefins, polyvinyl chlorides, polystyrenes, polyacrylates, polymethacrylates and cellulose acetates; mixed spun fibers of synthetic fiber or artificial fiber such as polyester fiber, polyamide fiber and cellulose acetate fiber; and mixed spun fibers of the synthetic fiber or the artificial fiber with natural fiber such as cellulose and wool; and shaped articles made of a copolymer such as AS resins and ABS resins.

These organic high polymers can be dyed with the heterocyclic dye having the formula [I] by the conventional manners.

When the fiber is dyed, the heterocyclic dye having the formula [I] is dispersed in an aqueous medium by the conventional manner with a dispersing agent such as condensates of naphthalenesulfonic acid and formaldehyde, higher alcohol sulfates and higher alkylbenzenesulfonates to prepare a dyeing bath or printing paste and the fiber is dyed by the dip dyeing or the printing.

In the dip dyeing, the fiber can be dyed in high fastnesses by applying the conventional dyeing process of a dispersing dye such as the high temperature dyeing process, the carrier dyeing process and the thermosol process.

The synthetic fibers such as polyester fiber can be colored by the dope dyeing process by adding the heterocyclic dye having the formula [I] at the polymerization or the melt-spinning.

When the synthetic resins are colored, the heterocyclic dye having the formula [I] is added to the synthetic resin and the mixture is heat-blended to mold by the press molding process, the injection molding process, the calender molding process and the extrusion molding process or the heterocyclic dye having the formula [I] is added to a liquid monomer or prepolymer and the mixture is polymerized or cured by the cast molding process whereby the colored article having high fastnesses can be obtained.

The present invention will be further illustrated by certain examples which are provided for purposes of illustration only and not intended to be limiting unless otherwise specified.

EXAMPLE 1

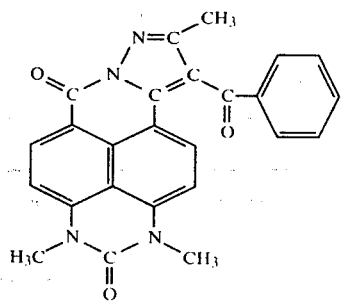

A dyeing bath was prepared by dispersing 0.5 g of the compound having the above-mentioned formula in 3 liters of water containing 1 g of a condensate of naphthalenesulfonic acid and formaldehyde and 2 g of higher alcoholsulfate.

A dip dyeing was carried out by dipping 100 g of polyester fiber in the dyeing bath at 130° C. for 60 minutes, soaping, washing with water and drying it to obtain polyester fiber having fluorescent brilliant greenish yellow color in high light fastness and sublimation fastness.

The perinone type compound used in the example was produced by the following process.

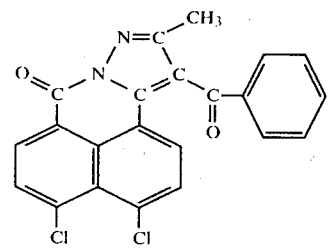

The reaction was carried out by heating 18 g of the compound having above-mentioned formula and 57 g of N,N'-dimethyl urea in 200 ml of nitrobenzene under refluxing for 5 hours. After cooling the reaction mixture, it was diluted with methanol, and the precipitate was filtered and sequentially washed with methanol and with water and dried to obtain 9 g of yellow crystals. The product was recrystallized from dimethyl formamide to obtain yellow crystals having a melting point of 320° to 321° C.

|  | Elemental Analysis: | | |
| --- | --- | --- | --- |
|  | C % | H % | N % |
| Calculated | 71.08 | 4.30 | 13.26 |
| Found | 70.91 | 4.15 | 13.11 |

Mass spectrum: peak $\frac{m}{e}$ 422.

EXAMPLE 2

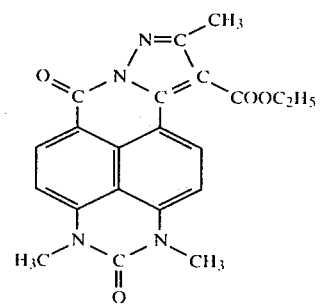

A dyeing bath was prepared by dispersing 0.5 g of the compound having the above-mentioned formula in 3 liters of water containing 1.5 g of a condensate of naphthalenesulfonic acid and formaldehyde and 1 g of higher alcoholsulfate and adding 15 g of a methyl naphthalene type carrier.

A dip dyeing was carried out by dipping 100 g of polyester fiber in the dyeing bath at 100° C. for 90° C., soaping, washing with water and drying it to obtain polyester fiber having fluorescent brilliant greenish yellow color in high fastnesses.

The compound used in the example was in a form of yellow crystals having a melting point of 305° to 307° C.

The compound was produced by the perimidonation in accordance with the process of Example 1 except substituting the compound having the formula

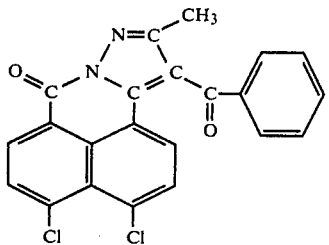

with the compound having the formula

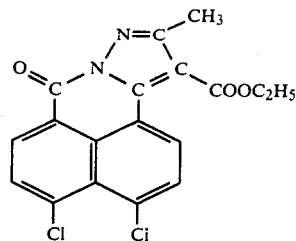

| Elementaly Analysis: | | | |
|---|---|---|---|
| | C % | H % | N % |
| Calculated | 64.60 | 4.65 | 14.35 |
| Found | 64.35 | 4.42 | 14.12 |

Mass spectrum: peak $\frac{m}{e} = 390$.

EXAMPLE 3

In accordance with the process of Example 1 except using the compounds shown in Table 1, polyester fiber was dyed to obtain the dyed polyester fibers having the color shown in Table 1.

TABLE 1

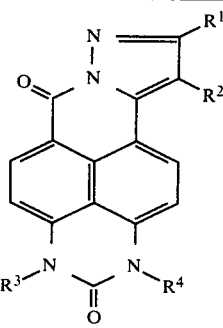

| No. | 1 | 2 | 3 | 4 |
|---|---|---|---|---|
| R¹ | —CH₃ | —CH₃ | —CH₃ | —CH₃ |
| R² | —CO—⌬ | —COOC₂H₅ | —COOC₄H₉(iso) | —CO—⌬ |
| R³ | —CH₃ | —CH₃ | —CH₃ | —C₂H₅ |
| R⁴ | —CH₃ | —CH₃ | —CH₃ | —C₂H₅ |
| mp. (°C.) | 320–321 | 305–307 | 339–340 | 235–237 |
| Mass spectrum peak $\frac{m}{e}$ | 422 | 390 | 418 | 450 |
| Elemental analysis: | | | | |
| C (%) Cal. | 71.08 | 64.60 | 66.02 | 71.99 |
| C (%) Found | 70.91 | 64.35 | 65.76 | 72.23 |
| H (%) Cal. | 4.30 | 4.65 | 5.30 | 4.92 |
| H (%) Found | 4.15 | 4.42 | 5.31 | 5.08 |
| N (%) Cal. | 13.26 | 14.35 | 13.29 | 12.44 |
| N (%) Found | 13.11 | 14.12 | 13.29 | 12.28 |
| Color dyed polyester | Bril. G-Y | Bril. G-Y | Bril. G-Y | Bril. G-Y |

| No. | 5 | 6 | 7 | 8 |
|---|---|---|---|---|
| R¹ | —⌬ | CH₃ | CH₃ | CH₃ |
| R² | —CO—⌬ | H | H | —COOC₄H₉(iso) |
| R³ | —CH₃ | —CH₃ | —C₂H₅ | —C₃H₇(n) |
| R⁴ | —CH₃ | —CH₃ | —C₂H₅ | —C₃H₇(n) |
| mp. (°C.) | 354–355 | 352–356 | 292–294 | 186–188 |
| Mass spectrum | 484 | 318 | 346 | 474 |

TABLE 1-continued

[Structure: naphthalimide-type with N-N=C(R¹)-C(R²)= substituent and R³-N, N-R⁴ amide groups]

| | | | | | | |
|---|---|---|---|---|---|---|
| peak m/e | | | | | | |
| Elemental analysis: | | | | | | |
| C (%) | Cal. | 74.22 | 67.92 | 69.35 | 68.33 | |
| | Found | 74.02 | 67.68 | 69.18 | 68.22 | |
| H (%) | Cal. | 4.15 | 4.43 | 5.24 | 6.37 | |
| | Found | 4.18 | 4.53 | 5.26 | 6.31 | |
| N (%) | Cal. | 11.54 | 17.60 | 16.17 | 11.81 | |
| | Found | 11.62 | 17.98 | 15.98 | 11.76 | |
| Color dyed polyester | | Bril. G-Y | Bril. G-Y | Bril. G-Y | Bril. G-Y | |

| No. | 9 | 10 | 11 |
|---|---|---|---|
| R¹ | CH₃ | CH₃ | CH₃ |
| R² | —COOC₄H₉(iso) | —COOC₄H₉(iso) | —COOC₄H₉(iso) |
| R³ | —C₄H₉(n) | —(CH₂)₃OCH₃ | —C₂H₅ |
| R⁴ | —C₄H₉(n) | —(CH₂)₃OCH₃ | —C₂H₅ |
| mp. (°C.) | 199–201 | 165–170 | 270–273 |
| Mass spectrum peak m/e | 502 | 534 | 446 |
| Elemental analysis: | | | |
| C (%) Cal. | 69.30 | 65.15 | 67.25 |
| Found | 69.21 | 65.10 | 67.21 |
| H (%) Cal. | 6.82 | 6.41 | 5.87 |
| Found | 6.78 | 6.38 | 5.82 |
| N (%) Cal. | 11.15 | 10.48 | 12.55 |
| Found | 11.06 | 10.41 | 12.51 |
| Color dyed polyester | Bril. G-Y | Bril. G-Y | Bril. G-Y |

| No. | 12 | 13 | 14 |
|---|---|---|---|
| R¹ | CH₃ | CH₃ | CH₃ |
| R² | —COOCH₂-(tetrahydrofuranyl) | —COO-(cyclohexyl) | —COOC₂H₄OC₄H₉(n) |
| R³ | —CH₃ | —CH₃ | —CH₃ |
| R⁴ | —CH₃ | —CH₃ | —CH₃ |
| mp. (°C.) | 280–288 | 327–328 | 261–262 |
| Mass spectrum peak m/e | 446 | 444 | 462 |
| Elemental analysis: | | | |
| C (%) Cal. | 64.56 | 67.55 | 64.92 |
| Found | 64.39 | 67.51 | 64.88 |
| H (%) Cal. | 4.97 | 5.44 | 5.67 |
| Found | 4.81 | 5.41 | 5.62 |
| N (%) Cal. | 12.55 | 12.61 | 12.12 |
| Found | 12.44 | 12.58 | 12.08 |
| Color dyed polyester | Bril. G-Y | Bril. G-Y | Bril. G-Y |

| No. | 15 | 16 | 17 |
|---|---|---|---|
| R¹ | CH₃ | CH₃ | CH₃ |
| R² | —COO(C₂H₄O)₂C₂H₅ | —COOCH₂-(phenyl) | —COOC₆H₁₃(n) |
| R³ | —CH₃ | —CH₃ | —CH₃ |
| R⁴ | —CH₃ | —CH₃ | —CH₃ |
| mp. (°C.) | 242–246 | 220–225 | 289–290 |
| Mass spectrum peak m/e | 478 | 452 | 446 |

TABLE 1-continued

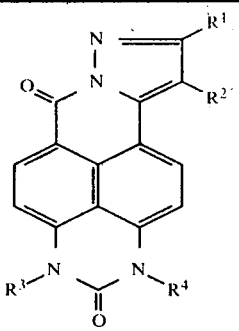

| Elemental analysis: | | | | |
|---|---|---|---|---|
| | Cal. | 62.75 | 69.01 | 67.25 |
| C (%) | Found | 62.71 | 68.95 | 67.18 |
| | Cal. | 5.48 | 4.46 | 5.87 |
| H (%) | Found | 5.41 | 4.41 | 5.81 |
| | Cal. | 11.71 | 12.38 | 12.55 |
| N (%) | Found | 11.68 | 12.31 | 12.47 |
| Color dyed polyester | | Bril. G-Y | Bril. G-Y | Bril. G-Y |

Note:
Bril. : brilliant
G-Y : greenish yellow

What is claimed is:

1. A heterocyclic dye having the formula:

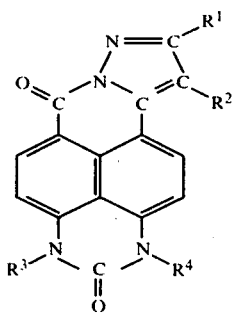

wherein $R^1$ represents hydrogen, $(C_1-C_8)$alkyl, trifluoromethyl, $(C_1-C_4)$alkoxycarbonyl, $(C_1-C_4)$alkoxycarbonyl$(C_1-C_4)$alkyl, phenyl, benzyl or phenethyl; $R^2$ represents hydrogen, cyano, acetyl, benzoyl, $(C_1-C_8)$alkoxycarbonyl, $(C_1-C_4)$alkoxy$(C_1-C_4)$alkoxycarbonyl, $(C_1-C_4)$alkoxy$(C_1-C_4)$alkoxy$(C_1-C_4)$alkoxycarbonyl, di$(C_1-C_4)$alkylamino$(C_1-C_4)$alkoxycarbonyl, cyclohexyloxycarbonyl, tolyloxycarbonyl, phenoxycarbonyl, benzyloxycarbonyl, tetrahydrofurfuryloxycarbonyl, carbamoyl, N-$(C_1-C_4)$-alkylcarbamoyl, N,N-di$(C_1-C_4)$alkylcarbamoyl, N-phenylcarbamoyl, or morpholinocarbonyl; and $R^3$ and $R^4$ can be the same or different and each represents hydrogen, $(C_1-C_8)$alkyl, $(C_1-C_4)$-alkoxy$(C_1-C_4)$alkyl, benzyl, phenethyl or phenyl which can be substituted by halogen atoms, $(C_1-C_4)$alkyl groups, or $(C_1-C_4)$alkoxy groups.

2. The heterocyclic dye of claim 1, wherein $R^1$ represents hydrogen, $(C_1-C_4)$alkyl, or phenyl; $R^2$ represents hydrogen, acetyl, benzoyl, $(C_1-C_4)$alkoxycarbonyl, or $(C_1-C_4)$alkoxyethoxycarbonyl; and $R^3$ and $R^4$ can be the same or different and each represents $(C_1-C_4)$alkyl, $(C_1-C_4)$alkoxyalkyl, or phenyl.

3. The heterocyclic dye of claim 1, wherein $R^1$ represents hydrogen, methyl, or ethyl; $R^2$ represents hydrogen, acetyl, benzoyl, methoxycarbonyl, ethoxycarbonyl, n-butyloxycarbonyl, isobutyloxycarbonyl, methoxyethoxycarbonyl, ethoxyethoxycarbonyl, n-butyloxyethoxycarbonyl, or isobutyloxyethoxycarbonyl; $R^3$ represents methyl or ethyl; and $R^4$ represents methyl or ethyl.

4. A heterocyclic dye having the formula:

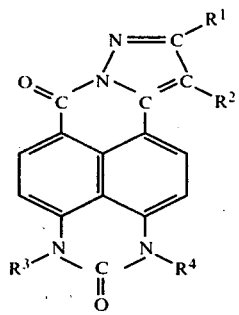

wherein $R^1$ represents hydrogen, $(C_1-C_8)$alkyl, trifluoromethyl, $(C_1-C_4)$alkoxycarbonyl, $(C_1-C_4)$alkoxycarbonyl$(C_1-C_4)$alkyl, phenyl, benzyl or phenethyl; $R^2$ represents cyano, acetyl, benzoyl, $(C_1-C_8)$alkoxycarbonyl, $(C_1-C_4)$alkoxy$(C_1-C_4)$alkoxycarbonyl, $(C_1-C_4)$alkoxy$(C_1-C_4)$alkoxy$(C_1-C_4)$alkoxycarbonyl, di$(C_1-C_4)$alkylamino$(C_1-C_4)$alkoxycarbonyl, cyclohexyloxycarbonyl, tolyloxycarbonyl, phenoxycarbonyl, benzyloxycarbonyl, tetrahydrofurfuryloxycarbonyl, carbamoyl, N-$(C_1-C_4)$alkylcarbamoyl, N,N-di$(C_1-C_4)$alkylcarbamoyl, N-phenylcarbamoyl, or morpholinocarbonyl; and $R^3$ and $R^4$ can be the same or different and each represents hydrogen, $(C_1-C_8)$alkyl, $(C_1-C_4)$alkoxy$(C_1-C_4)$-alkyl, benzyl, phenethyl, or phenyl which can be substituted by halogen atoms, $(C_1-C_4)$alkyl groups, or $(C_1-C_4)$alkoxy groups.

5. The heterocyclic dye of claim 4, wherein $R^1$ represents hydrogen, $(C_1-C_4)$alkyl, or phenyl;

$R^2$ represents acetyl, benzoyl, $(C_1-C_4)$alkoxycarbonyl, or $(C_1-C_4)$alkoxyethoxycarbonyl; and $R^3$ and $R^4$ can be the same or different and each represents $(C_1-C_4)$alkyl, $(C_1-C_4)$alkoxyalkyl, or phenyl.

6. The heterocyclic dye of claim 4, wherein $R^1$ represents hydrogen, methyl, or ethyl; $R^2$ represents acetyl, benzoyl, methoxycarbonyl, ethoxycarbonyl, n-butyloxycarbonyl, isobutyloxycarbonyl, methoxyethoxycarbonyl, ethoxyethoxycarbonyl, n-butyloxyethoxycarbonyl, or isobutyloxyethoxycarbonyl; $R^3$ represents methyl or ethyl; and $R^4$ represents methyl or ethyl.

* * * * *